United States Patent
Katsuya

(10) Patent No.: US 12,499,648 B2
(45) Date of Patent: Dec. 16, 2025

(54) IMAGE PROCESSING APPARATUS, IMAGE CAPTURING APPARATUS, CONTROL METHOD, AND STORAGE MEDIUM FOR DETECTING SUBJECT IN CAPTURED IMAGE

(71) Applicant: CANON KABUSHIKI KAISHA, Tokyo (JP)

(72) Inventor: Shohei Katsuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 18/160,126

(22) Filed: Jan. 26, 2023

(65) Prior Publication Data
US 2023/0245416 A1   Aug. 3, 2023

(30) Foreign Application Priority Data
Jan. 31, 2022   (JP) ................. 2022-013583

(51) Int. Cl.
G06V 10/25   (2022.01)
G06T 7/20   (2017.01)
H04N 7/01   (2006.01)

(52) U.S. Cl.
CPC ............... *G06V 10/25* (2022.01); *G06T 7/20* (2013.01); *H04N 7/013* (2013.01); *G06T 2207/10144* (2013.01); *G06T 2207/10148* (2013.01); *G06V 2201/07* (2022.01)

(58) Field of Classification Search
CPC .. G06V 2201/07; G06V 40/161; G06V 10/25; G06V 10/764; G06V 20/60; G06V 10/235; G06T 7/20; G06T 2207/10148; G06T 2207/10144; G02B 7/28; H04N 23/60; H04N 23/61; H04N 23/67; H04N 23/667
See application file for complete search history.

(56) References Cited

FOREIGN PATENT DOCUMENTS

| JP | 2020003759 A | | 1/2020 | |
|----|--------------|---|--------|---|
| JP | 2020008899 A | * | 1/2020 | ......... G06K 9/00342 |
| JP | 2021132369 A | | 9/2021 | |

* cited by examiner

*Primary Examiner* — Sumati Lefkowitz
*Assistant Examiner* — Connor L Hansen
(74) *Attorney, Agent, or Firm* — Canon U.S.A., Inc. IP Division

(57) ABSTRACT

There is provided an image processing apparatus. A detection unit executes subject detection processing with respect to each of a plurality of images obtained through image capturing performed by an image capturing circuit, using one or more dictionaries that are a part of a plurality of dictionaries. The plurality of dictionaries is respectively intended to detect subjects of different types. A setting unit sets a tracking mode. A selection unit selects the one or more dictionaries used by the detection unit, wherein the selection unit selects a second dictionary at a frequency corresponding to the tracking mode. The second dictionary is different from a first dictionary that corresponds to a type of a first subject detected in a previous image.

12 Claims, 14 Drawing Sheets

FIG. 6A

DICTIONARY TYPE AND DETECTOR PROCESSING RESTRICTION

| DICTIONARY | PERSON | DOG | BIRD | 4-WHEELS | 2-WHEELS |
|---|---|---|---|---|---|
| DETECTION REGION | FACE | FACE | FACE | ENTIRETY | ENTIRETY |

| DETECTOR | 1 |
|---|---|
| NUMBER OF TIMES DETECTION PROCESSING CAN BE EXECUTED IN 1 FRAME | 3 TIMES |

FIG. 6B

DETECTION CYCLE OF EACH DICTIONARY WHEN TRACKING MODE = "NORMAL"

[frame/DETECTION]

| MAIN SUBJECT | DICTIONARY | | | | |
|---|---|---|---|---|---|
| | PERSON | DOG | BIRD | 4-WHEELS | 2-WHEELS |
| NONE | 2 | 2 | 2 | 2 | 2 |
| PERSON | 1 | 2 | 2 | 2 | 2 |
| DOG | 2 | 1 | 2 | 2 | 2 |
| BIRD | 2 | 2 | 1 | 2 | 2 |
| 4-WHEELS | 2 | 2 | 2 | 1 | 2 |
| 2-WHEELS | 2 | 2 | 2 | 2 | 1 |

FIG. 6C

DETECTION CYCLE OF EACH DICTIONARY WHEN TRACKING MODE = "TRACKING PRIORITY"

[frame/DETECTION]

| MAIN SUBJECT | DICTIONARY | | | | |
|---|---|---|---|---|---|
| | PERSON | DOG | BIRD | 4-WHEELS | 2-WHEELS |
| NONE | 2 | 2 | 2 | 2 | 2 |
| PERSON | 1 | 0 | 0 | 0 | 0 |
| DOG | 0 | 1 | 0 | 0 | 0 |
| BIRD | 0 | 0 | 1 | 0 | 0 |
| 4-WHEELS | 0 | 0 | 0 | 1 | 0 |
| 2-WHEELS | 0 | 0 | 0 | 0 | 1 |

FIG. 8A

DICTIONARY TYPE AND DETECTOR PROCESSING RESTRICTION

| SUBJECT TYPE | PERSON | DOG | BIRD | 4-WHEELS | 2-WHEELS |
|---|---|---|---|---|---|
| BASE DICTIONARY | FACE | FACE | FACE | ENTIRETY | ENTIRETY |
| LOCAL DICTIONARIES | PUPIL | PUPIL | PUPIL | — | — |

| DETECTOR | 1 |
|---|---|
| NUMBER OF TIMES DETECTION PROCESSING CAN BE EXECUTE IN 1 FRAME | 3 TIMES |

FIG. 8B

DETECTION CYCLE OF EACH DICTIONARY WHEN TRACKING MODE = "NORMAL"

[frame/DETECTION]

| MAIN SUBJECT | BASE DICTIONARY | | | | | LOCAL DICTIONARY | | |
|---|---|---|---|---|---|---|---|---|
| | PERSON | DOG | BIRD | 4-WHEELS | 2-WHEELS | PERSON/PUPIL | DOG/PUPIL | BIRD/PUPIL |
| NONE | 2 | 2 | 2 | 2 | 2 | 0 | 0 | 0 |
| PERSON | 1 | 4 | 4 | 4 | 4 | 1 | 0 | 0 |
| DOG | 4 | 1 | 4 | 4 | 4 | 0 | 1 | 0 |
| BIRD | 4 | 4 | 1 | 4 | 4 | 0 | 0 | 1 |
| 4-WHEELS | 2 | 2 | 2 | 1 | 2 | 0 | 0 | 0 |
| 2-WHEELS | 2 | 2 | 2 | 2 | 1 | 0 | 0 | 0 |

FIG. 8C

DETECTION CYCLE OF EACH DICTIONARY WHEN TRACKING MODE = "TRACKING PRIORITY"

[frame/DETECTION]

| MAIN SUBJECT | BASE DICTIONARY | | | | | LOCAL DICTIONARY | | |
|---|---|---|---|---|---|---|---|---|
| | PERSON | DOG | BIRD | 4-WHEELS | 2-WHEELS | PERSON/PUPIL | DOG/PUPIL | BIRD/PUPIL |
| NONE | 2 | 2 | 2 | 2 | 2 | 0 | 0 | 0 |
| PERSON | 1 | 0 | 0 | 0 | 0 | 1 | 0 | 0 |
| DOG | 0 | 1 | 0 | 0 | 0 | 0 | 1 | 0 |
| BIRD | 0 | 0 | 1 | 0 | 0 | 0 | 0 | 1 |
| 4-WHEELS | 0 | 0 | 0 | 1 | 0 | 0 | 0 | 0 |
| 2-WHEELS | 0 | 0 | 0 | 0 | 1 | 0 | 0 | 0 |

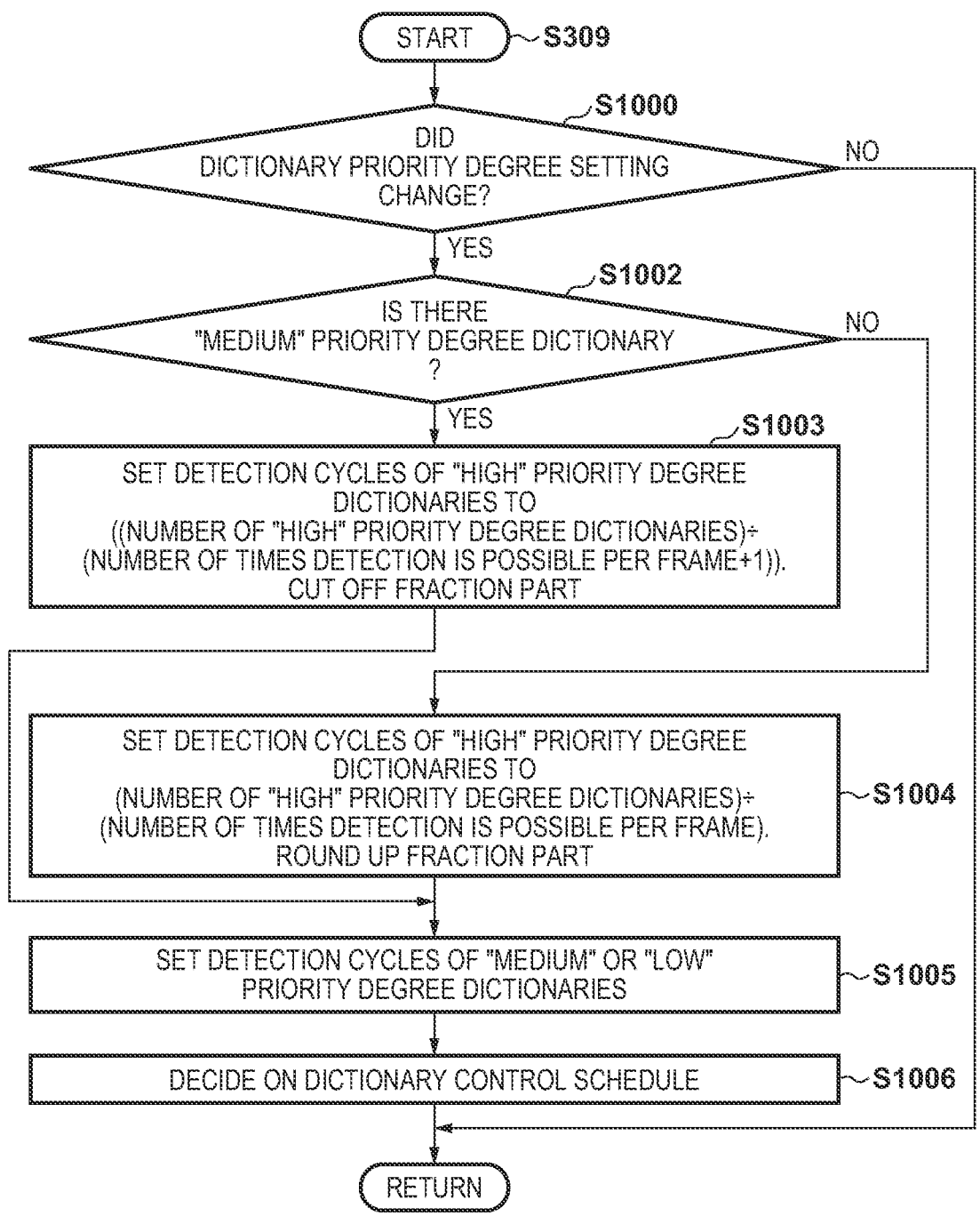

FIG. 11A

DETECTOR PROCESSING RESTRICTION

| DETECTOR | 1 |
|---|---|
| NUMBER OF TIMES DETECTION PROCESSING CAN BE EXECUTED IN 1 FRAME | 2 TIMES |

FIG. 11B

DETECTION CYCLE OF "HIGH" PRIORITY DEGREE DICTIONARIES

[frame/DETECTION]

| | | NUMBER OF "HIGH" PRIORITY DEGREE DICTIONARIES | | | | | |
|---|---|---|---|---|---|---|---|
| | | 2 | 3 | 4 | 5 | 6 | ... |
| NUMBER OF "MEDIUM" PRIORITY DEGREE DICTIONARIES | 0 | 1 | 2 | 2 | 3 | 3 | ... |
| | 1 | 2 | 2 | 3 | 3 | 4 | ... |
| | 2 | 2 | 2 | 3 | 3 | 4 | ... |
| | ... | 2 | 2 | 3 | 3 | 4 | ... |

FIG. 12A

DICTIONARY TYPE AND DETECTOR PROCESSING RESTRICTION

| SUBJECT TYPE | PERSON | DOG | BIRD | 4-WHEELS | 2-WHEELS |
|---|---|---|---|---|---|
| BASE DICTIONARY | FACE | FACE | FACE | ENTIRETY | ENTIRETY |
| LOCAL DICTIONARY 1 | PUPIL | PUPIL | PUPIL | — | — |
| LOCAL DICTIONARY 2 | TORSO | — | — | — | — |

| DETECTOR | 1 |
|---|---|
| NUMBER OF TIMES DETECTION PROCESSING CAN BE EXECUTED IN 1 FRAME | 2 TIMES |

FIG. 12B

DETECTION CYCLE OF EACH DICTIONARY WHEN TRACKING MODE = "NORMAL"

[frame/DETECTION]

| MAIN SUBJECT | BASE DICTIONARY | | | | | LOCAL DICTIONARY | | | |
|---|---|---|---|---|---|---|---|---|---|
| | PERSON | DOG | BIRD | 4-WHEELS | 2-WHEELS | PERSON/PUPIL | PERSON/TORSO | DOG/PUPIL | BIRD/PUPIL |
| NONE | 2.5 | 2.5 | 2.5 | 2.5 | 2.5 | 0 | 0 | 0 | 0 |
| PERSON | 2 | 8 | 8 | 8 | 8 | 2 | 2 | 0 | 0 |
| DOG | 4 | 1 | 4 | 4 | 4 | 0 | 0 | 1 | 0 |
| BIRD | 4 | 4 | 1 | 4 | 4 | 0 | 0 | 0 | 1 |
| 4-WHEELS | 2 | 2 | 2 | 1 | 2 | 0 | 0 | 0 | 0 |
| 2-WHEELS | 2 | 2 | 2 | 2 | 1 | 0 | 0 | 0 | 0 |

FIG. 12C

DETECTION CYCLE OF EACH DICTIONARY WHEN TRACKING MODE = "TRACKING PRIORITY"

[frame/DETECTION]

| MAIN SUBJECT | BASE DICTIONARY | | | | | LOCAL DICTIONARY | | | |
|---|---|---|---|---|---|---|---|---|---|
| | PERSON | DOG | BIRD | 4-WHEELS | 2-WHEELS | PERSON/PUPIL | PERSON/TORSO | DOG/PUPIL | BIRD/PUPIL |
| NONE | 2.5 | 2.5 | 2.5 | 2.5 | 2.5 | 0 | 0 | 0 | 0 |
| PERSON | 2 | 0 | 0 | 0 | 0 | 2 | 2 | 0 | 0 |
| DOG | 0 | 1 | 0 | 0 | 0 | 0 | 0 | 1 | 0 |
| BIRD | 0 | 0 | 1 | 0 | 0 | 0 | 0 | 0 | 1 |
| 4-WHEELS | 0 | 0 | 0 | 1 | 0 | 0 | 0 | 0 | 0 |
| 2-WHEELS | 0 | 0 | 0 | 0 | 1 | 0 | 0 | 0 | 0 |

IMAGE PROCESSING APPARATUS, IMAGE CAPTURING APPARATUS, CONTROL METHOD, AND STORAGE MEDIUM FOR DETECTING SUBJECT IN CAPTURED IMAGE

BACKGROUND OF THE DISCLOSURE

Field of the Disclosure

The present disclosure relates to an image processing apparatus, an image capturing apparatus, a control method, and a storage medium.

Description of the Related Art

Conventionally, as digital cameras and the like, there have been practical applications of products with a tracking AF mode, in which the face and pupils of a person are detected from images that are sequentially output from an image sensor, and a focus state and an exposure state are continuously optimized with respect to the detected face or pupils of the person.

Furthermore, in recent years, the use of machine learning methods has started to enable detection of not only the face and pupils of a person, but also various types of subjects. In this case, as a result of inputting an image to a detector together with dictionary data (hereinafter simply referred to as a "dictionary") that has been obtained through learning related to a subject to be detected, the subject included in the image can be detected. Various types of subjects can be detected from an image by preparing a plurality of dictionaries corresponding to various types of subjects and changing a dictionary to be input to the detector.

When the number of types of subjects to be detected increases, the number of types of dictionaries to be used also increases. On an apparatus that has a limited number of arithmetic logic circuits composing a detector and a limited processing capability, such as a digital camera, it is possible to use a control method that realizes detection of a plurality of types of subjects by switching among dictionaries on a per-frame basis. Note that one frame implied here denotes a time period or a cycle in which computation processing and camera control are executed and completed with respect to an image output from an image sensor.

For example, Japanese Patent Laid-Open No. 2021-132369 discloses a configuration in which, upon successful detection of a subject, the frequency of use of a dictionary corresponding to the detected subject is increased in subsequent frames, thereby performing stable subject tracking.

According to Japanese Patent Laid-Open No. 2021-132369, with the increase in the frequency of use of the dictionary corresponding to the detected subject, the frequency of use of other dictionaries becomes relatively low. However, Japanese Patent Laid-Open No. 2021-132369 does not consider placing the frequency of use of other dictionaries under direct control.

SUMMARY OF THE DISCLOSURE

The present disclosure has been made in view of the aforementioned situation. The present disclosure provides a technique to enable an adjustment of a balance between the tracking performance for a detected subject and the detection performance for another subject by enabling a change in the frequency of use of a dictionary that is different from a dictionary corresponding to the type of the detected subject.

According to a first aspect of the present disclosure, there is provided an image processing apparatus comprising at least one processor which functions as: a detection unit configured to execute subject detection processing with respect to each of a plurality of images obtained through image capturing performed by an image capturing circuit, using one or more dictionaries that are a part of a plurality of dictionaries, the plurality of dictionaries being respectively intended to detect subjects of different types; a setting unit configured to set a tracking mode; and a selection unit configured to select the one or more dictionaries used by the detection unit, wherein the selection unit selects a second dictionary at a frequency corresponding to the tracking mode, the second dictionary being different from a first dictionary that corresponds to a type of a first subject detected in a previous image.

Further features of the present disclosure will become apparent from the following description of exemplary embodiments with reference to the attached drawings.

BRIEF DESCRIPTION OF THE DRAWINGS

FIGS. 6A to 6C are diagrams illustrating examples of detection cycles and a control schedule for dictionaries for a case where there is no local dictionary according to the first embodiment.

FIGS. 8A to 8C are diagrams illustrating examples of detection cycles and a control schedule for dictionaries for a case where there are local dictionaries according to the first embodiment.

FIG. 10 is a flowchart showing the details of processing for deciding on a control schedule for dictionaries in step S309 of FIG. 3 according to a second embodiment.

FIGS. 11A and 11B are diagrams in which the calculation results of steps S1003 and S1004 in FIG. 10 are shown in order.

FIGS. 12A to 12C are diagrams illustrating two specific examples related to detection cycles and a control schedule for dictionaries according to the second embodiment.

DESCRIPTION OF THE EMBODIMENTS

Figure 1:
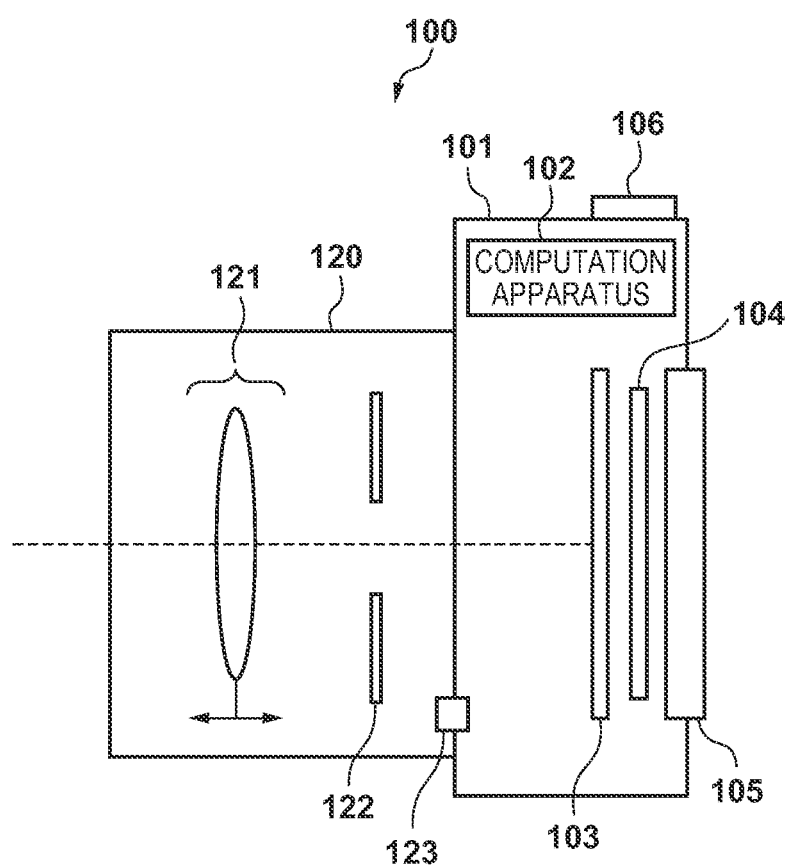
FIG. 1 is a side cross-sectional view showing a configuration of a camera (a digital single-lens camera).

Hereinafter, embodiments will be described in detail with reference to the attached drawings. Note, the following embodiments are not intended to limit the scope of the present disclosure. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 2:
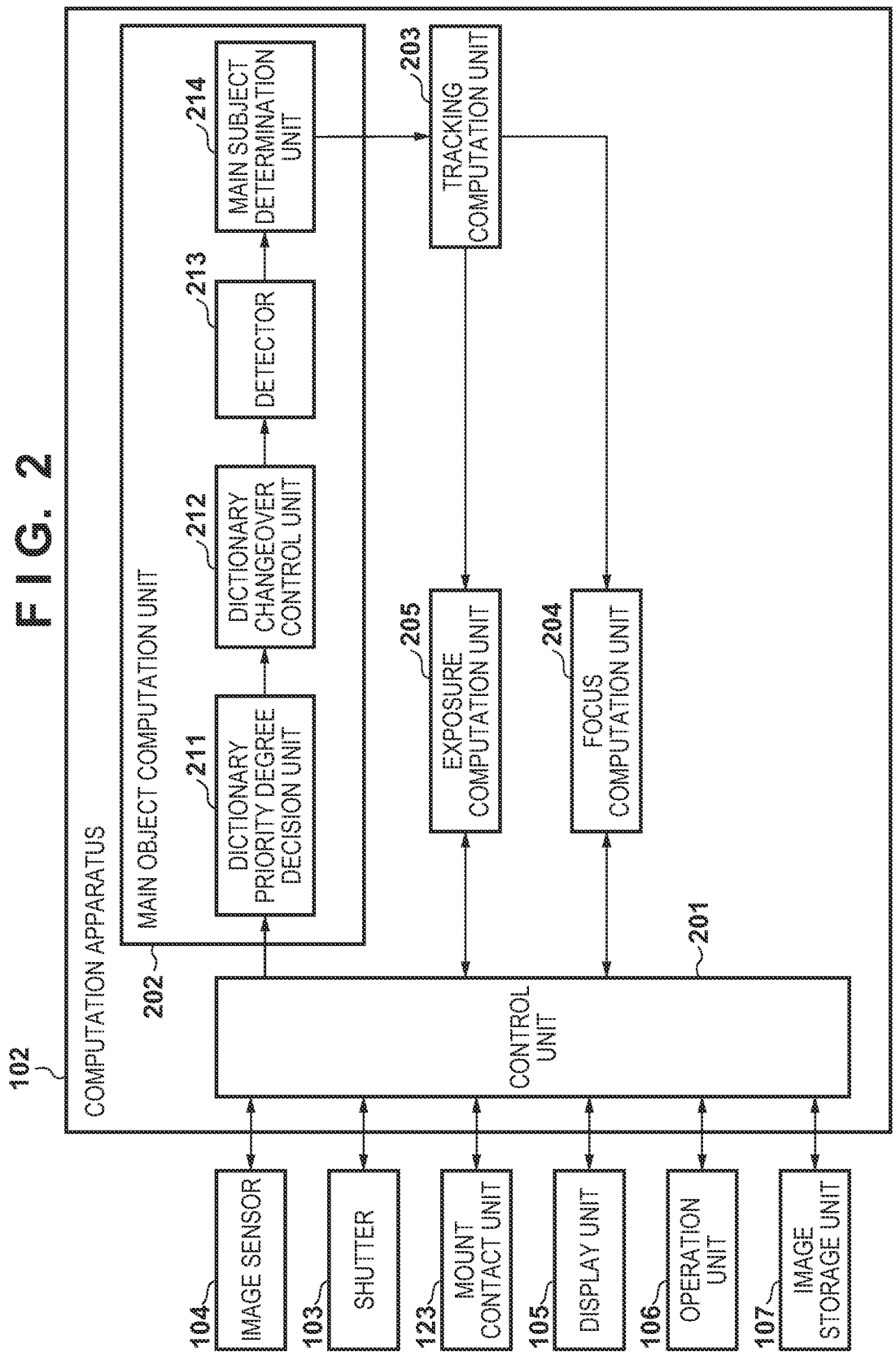
FIG. 2 is a functional block diagram of the camera.

FIG. 1 is a side cross-sectional view showing a configuration of a camera 100 (a digital single-lens camera), which is one example of an image capturing apparatus including an image processing apparatus. FIG. 2 is a functional block diagram of the camera 100.

As shown in FIG. 1, in the camera 100 according to the present embodiment, a detachable and exchangeable lens unit 120 is mounted on the front surface side (subject side) of a camera main body 101. The lens unit 120 includes a focusing lens 121, a diaphragm 122, and the like, and is electrically connected to the camera main body 101 via a mount contact unit 123. In this way, the amount of light taken in the camera main body 101 and the focal position can be adjusted. Note that the focusing lens 121 can also be manually adjusted by a user.

An image sensor 104 is composed of a CCD sensor, a CMOS sensor, or the like, and includes an infrared cut-off filter, a low-pass filter, or the like. The image sensor 104 photoelectrically converts a subject image that has been formed as a result of being transmitted through a shooting optical system of the lens unit 120 at the time of shooting, and transmits signals for generating a shot image to a computation apparatus 102. The computation apparatus 102 generates a shot image from received signals, stores the shot image in an image storage unit 107, and further displays the shot image on a display unit 105, such as an LCD. The image storage unit 107 includes, for example, a storage medium, such as an SD card. A shutter 103 blocks light from the image sensor 104 when shooting is not performed, and opens and exposes the image sensor 104 to light when shooting is performed.

Next, a description is given of a configuration related to control on the camera 100 with reference to the functional block diagram of FIG. 2. The computation apparatus 102 includes, for example, a dedicated circuit for executing specific computation processing at high speed, in addition to a multi-core CPU that can perform parallel processing of a plurality of tasks, a RAM, and a ROM. A control unit 201, a main subject computation unit 202, a tracking computation unit 203, a focus computation unit 204, and an exposure computation unit 205 are configured in the computation apparatus 102 using the foregoing items of hardware. The control unit 201 controls each component of the camera main body 101 and the lens unit 120.

The main subject computation unit 202 is configured to include a dictionary priority degree decision unit 211, a dictionary changeover control unit 212, a detector 213, and a main subject determination unit 214. The detector 213 executes processing for detecting a specific region of a subject (e.g., the face and pupils of a person, or the face and pupils of a dog) from an image. There are cases where the specific region of the subject is not detected, and there are also cases where a plurality of specific regions are detected. It is sufficient to use any known method, such as AdaBoost and a convolutional neural network, as a detection method. Furthermore, as a mode of implementation thereof, it may be a program that runs on a CPU, may be dedicated hardware, or may be a combination of these. Moreover, changing a dictionary to be input to the detector 213 makes it possible to change the type of the subject to be detected.

Dictionaries are data in which, for example, the features of a corresponding subject have been registered, and control instructions for a logic circuit have been described for each subject type. In the present embodiment, dictionaries for respective subjects are stored in the ROM inside the computation apparatus 102 (a plurality of types of dictionaries are stored). As there are dictionaries for respective subject types, different types of subjects can be detected by switching among the dictionaries. For example, the dictionary priority degree decision unit 211 calculates the priority degrees of the dictionaries at a predetermined timing, which will be described later, and decides on a dictionary that is to be input by the dictionary changeover control unit 212 to the detector 213 based on the result of this computation. The result of subject detection obtained from the detector 213 is transmitted to the main subject determination unit 214; a main subject is determined from the detected subjects, and a main subject region is set. The main subject is determined using a known determination method based on, for example, a size, a position, and a reliability degree of a detection result. In a case where no subject has been detected by the detector 213, the main subject determination unit 214 can decide on a main subject region based on the past detection results, feature amounts of, for example, edges of a target frame, subject distances, and so forth.

For example, a detector that performs subject detection using a convolutional neural network (CNN) can be used as the detector 213.

Dictionaries that are used by the detector 213 in detection of respective subjects include trained parameters that have been generated in advance in an external device (e.g., a PC) or the camera 100 through machine learning of the CNN.

The machine learning of the CNN can be conducted using any method. For example, a predetermined computer, such as a server, may conduct the machine learning of the CNN, and the camera 100 may obtain the trained CNN from the predetermined computer. The CNN may be trained by, for example, the predetermined computer receiving image data for training as an input, and performing supervised learning by using the position and the like of a subject corresponding to the image data for training as supervisory data. Also, the CNN may be trained by the predetermined computer receiving image data for training as an input, and performing supervised learning by using a dictionary corresponding to a subject in the image data for training as supervisory data. Trained parameters of the CNN are generated through the foregoing training.

While the detector 213 used in the present embodiment has a processing capability to execute subject detection multiple times by switching among the dictionaries within a period of one frame, it is assumed that all types of subjects to be detected by the camera 100 are not always detected within the period of one frame. That is to say, in the present embodiment, the processing capability of the detector 213 is not necessarily limited, but it is assumed that a plurality of types of subjects that are smaller in number than all types are detected in accordance with preset settings while switching among the dictionaries, in order to save the processing speed and the bandwidth of a bus.

The tracking computation unit 203 performs tracking of a main subject region based on detection information on the main subject. The focus computation unit 204 calculates control values for the focusing lens 121 for bringing the main subject region into focus. Also, the exposure computation unit 205 calculates control values for the diaphragm 122 and the image sensor 104 for placing the main subject region under appropriate exposure.

An operation unit 106 includes a release switch, a mode dial, and so forth, and the control unit 201 can accept, for example, a shooting instruction and a mode changing instruction from the user via the operation unit 106.

Figure 3:
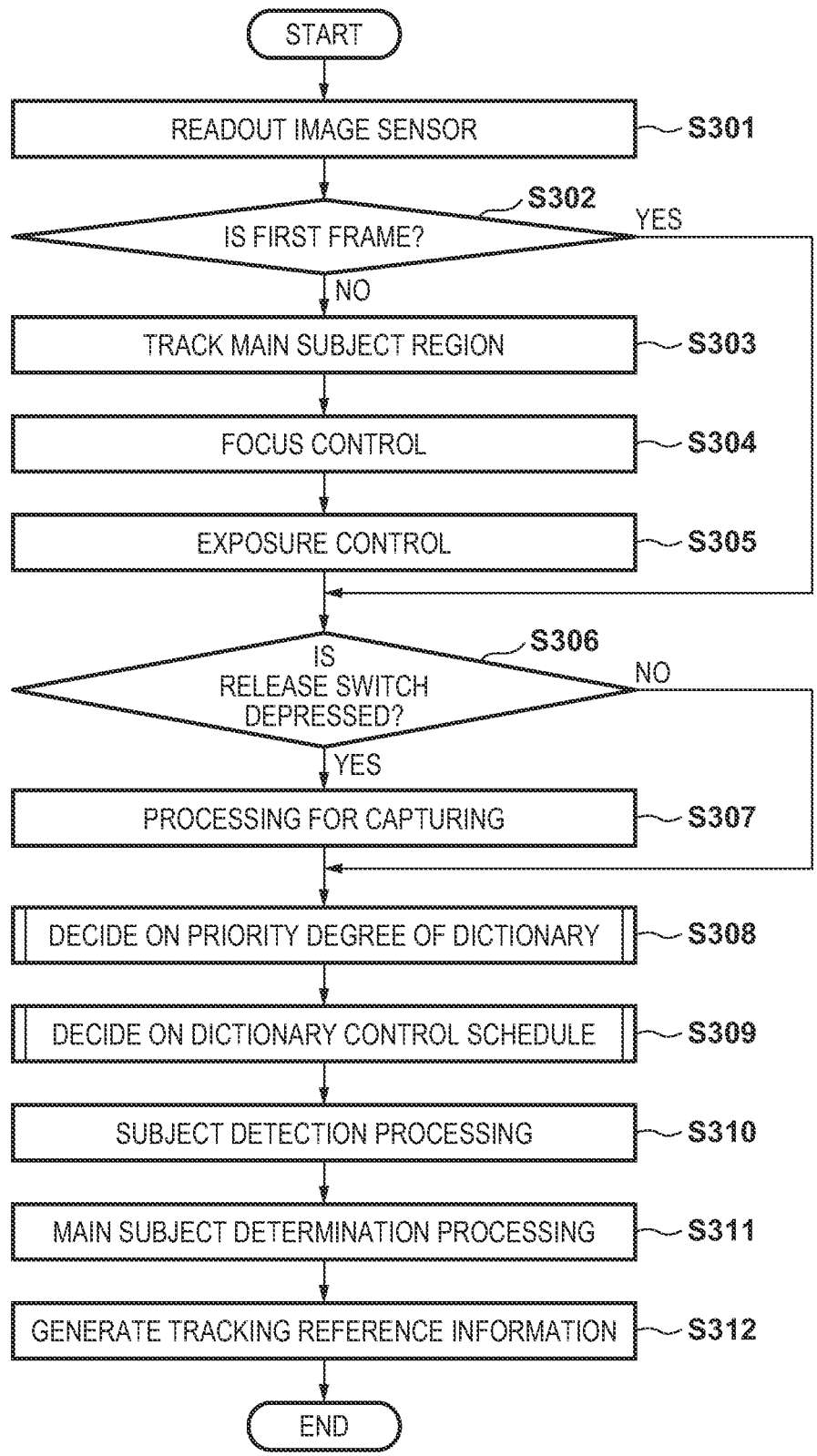
FIG. 3 is a flowchart of the operations of the camera corresponding to one frame.

Next, the operations of the camera 100 corresponding to one frame will be described with reference to FIG. 3. The operations of the flowchart of FIG. 3 are executed repeatedly on a per-frame basis.

In step S301, the control unit 201 executes processing for reading out pixel signals from the image sensor 104, and generates image data from the pixel signals that have been read out. The pixel signals and the generated image data are stored in the RAM inside the computation apparatus 102.

In step S302, the control unit 201 determines whether the current frame is the first frame. In a case where the current frame is the first frame, the processing step proceeds to step S306; otherwise, the processing step proceeds to step S303.

In step S303, using tracking reference information that was generated in connection with a previous frame in later-described step S312, the tracking computation unit 203 executes tracking processing for calculating the position, in the current frame, of a main subject region that was set in the previous frame. It is sufficient to use any known method as an algorithm used in the tracking processing. For example, feature amounts that have been extracted, through predetermined feature extraction processing, from the main subject region set in the previous frame are used as the tracking reference information. In this case, the tracking computation unit 203 can track the main subject region by searching the current frame for a region with feature amounts that are at close distances from one another. Furthermore, as a mode of implementation of the algorithm, it may be a program that runs on a CPU, may be dedicated hardware, or may be a combination of these. After the tracking processing has been completed, the tracking computation unit 203 stores the tracking result (the position and size of the main subject region in the current frame) in the RAM inside the computation apparatus 102.

In step S304, the focus computation unit 204 calculates control values for the focusing lens 121 so as to bring the main subject region into focus using the tracking result generated in step S303, the pixel signals and the image data obtained in step S301, and so forth. It is sufficient to use any known method, such as a contrast method and a phase-difference detection method, as a method of calculating the control values for the focusing lens 121. Once the calculation of the control values for the focusing lens 121 has been completed, the focus computation unit 204 notifies the control unit 201 of the control values for the focusing lens 121. The control unit 201 controls the focusing lens 121 via the mount contact unit 123 based on the control values of which it has been notified.

In step S305, the exposure computation unit 205 calculates control values for the image sensor 104 and the diaphragm 122 so as to place the main subject region under appropriate exposure using the tracking result generated in step S303 and the pixel signals and the image data obtained in step S301. It is sufficient to use any known method as a method of calculating the control values for the image sensor 104 and the diaphragm 122. Once the calculation of the control values for the image sensor 104 and the diaphragm 122 has been completed, the exposure computation unit 205 notifies the control unit 201 of the control values for the image sensor 104 and the diaphragm 122. The control unit 201 controls the image sensor 104, and also controls the diaphragm 122 via the mount contact unit 123, based on the control values for the image sensor 104 and the diaphragm 122 of which it has been notified.

In step S306, the control unit 201 reads in the state of the operation unit 106, and determines whether the release switch has been depressed. In a case where the release switch has been depressed, the processing step proceeds to step S307; otherwise, the processing step proceeds to step S308.

In step S307, the control unit 201 executes processing for capturing a still image. The control unit 201 drives the shutter 103 based on the control values obtained in step S305, exposes the image sensor 104 to light, and generates image data from pixel signals that have been read out from the image sensor 104 that has been exposed to light. The generated image data is stored in the image storage unit 107.

In step S308, the dictionary priority degree decision unit 211 decides on the priority degree of each dictionary. The details of processing of step S308 will be described later using FIG. 4.

In step S309, the dictionary changeover control unit 212 decides on a control schedule for dictionaries based on the priority degree of each dictionary that was decided on in step S308. The details of step S309 will be described later using FIG. 5.

In step S310, the dictionary changeover control unit 212 selects a dictionary in accordance with the control schedule that was decided on in step S309, and inputs the selected dictionary and the image data generated in step S301 to the detector 213. Then, the detector 213 executes processing for detecting a subject (subject detection processing) by detecting a specific region of a subject of the type corresponding to the dictionary with respect to the input image data.

In step S311, the main subject determination unit 214 determines a main subject based on the detection result obtained in step S310. The main subject can be determined using any known determination method based on, for example, the site (e.g., the entire body, face, pupils, etc.), size, and position of the detection result, the reliability degree of the detection result, and so forth. The main subject determination unit 214 stores information indicating the determined main subject and a region corresponding to the main subject (a main subject region) in the RAM inside the computation apparatus 102.

In step S312, based on the information on the main subject region obtained in step S311 and on the image data generated in step S301, the tracking computation unit 203 generates tracking reference information to be used in the tracking processing of step S303 with respect to the next frame. The generated tracking reference information is stored in the RAM inside the computation apparatus 102.

Once processing of step S312 has finished, the operations of the camera 100 corresponding to one frame come to an end. As long as the camera 100 keeps operating, the camera 100 repeats processing that has been described thus far, from step S301 again, thereby continuing sequential image capturing at a predetermined frame rate.

Next, the details of processing for deciding on the priority degrees of dictionaries in step S308 of FIG. 3 will be described with reference to FIG. 4.

In step S400a, the dictionary priority degree decision unit 211 determines whether a main subject or a tracking mode has changed. The tracking mode will be described later in step S405. In a case where the main subject or the tracking mode has changed, the processing step proceeds to step S401; in a case where neither the main subject nor the tracking mode has changed, the processing step proceeds to step S400b.

In step S400b, the dictionary priority degree decision unit 211 determines whether the current frame is the first frame. In a case where the current frame is the first frame, the processing step proceeds to step S407; otherwise, processing of the present flowchart ends. Therefore, in two cases, namely, in a case where the main subject or the tracking mode has changed and a case where the current frame is the first frame, processing for deciding on the priority degrees of dictionaries is executed; in other cases, the priority degrees of dictionaries that were decided on before are maintained.

In step S401, the dictionary priority degree decision unit 211 determines whether a previous frame includes the main subject (i.e., whether the main subject was determined through processing of step S311 related to the previous frame) with reference to information stored in the RAM inside the computation apparatus 102. In a case where the previous frame includes the main subject, the processing step proceeds to step S402. In a case where the previous frame does not include the main subject, the processing step proceeds to step S407. For example, in a case where not a single subject was detected through processing of step S310 related to the previous frame, the main subject is not determined through processing of step S311, and thus the previous frame does not include the main subject.

In step S402, the dictionary priority degree decision unit 211 sets the priority degree of the dictionary corresponding to the type of the main subject detected in the previous frame at "high". In the present embodiment, it is assumed that the priority degrees of dictionaries are set at three levels: "high", "medium", and "low". However, the method of setting the priority degrees can be changed as appropriate in accordance with the number of dictionaries, the processing capability of the detector 213 (the number of times detection processing can be executed within one frame period), and so forth.

In step S403, the dictionary priority degree decision unit 211 determines whether there is a local dictionary corresponding to the main subject. Depending on the types of subjects, a base region (primary region) and a local region (secondary region), which is different from the base region, are defined as detection regions (specific regions to be detected). Specifically, a base region and a local region are defined in accordance with, for example, the following relationships.

(In the case of a person) Base region: Face Local region: Pupils (In the case of a dog) Base region: Face Local region: Pupils In many cases, a local region is a region inside a base region, as with the foregoing examples; however, no limitation is intended by this. For example, with regard to a "person" for which a face is defined as a base region, a torso can also be defined as a local region. Therefore, although a local region is a region that is "local" in comparison to the entirety of a subject, it is not necessarily "local" in comparison to a base region.

In the following description, the dictionaries for detecting the base regions of subjects and the dictionaries for detecting the local regions (secondary regions) of the subjects may simply and collectively be referred to as "dictionaries". Furthermore, the dictionaries for detecting the base regions of the subjects may be referred to as "base dictionaries" or "primary dictionaries", and the dictionaries for detecting the local regions (secondary regions) of the subjects may be referred to as "local dictionaries" or "secondary dictionaries", where necessary.

In the present embodiment, a dictionary-based detection of a local region is not made from the entirety of a shot image, but is made by inputting, to the detector 213, an image obtained by cutting out a portion including a detected base region of a subject and the vicinity thereof from the original shot image. That is to say, in a case where the type of the target subject is a person (strictly speaking, a person's face), processing for detecting the pupils, which are local regions, is executed only after the person's face has been detected. In a case where there is a local dictionary corresponding to the main subject, the processing step proceeds to step S404; in a case where there is no local dictionary corresponding to the main subject, the processing step proceeds to step S405.

In step S404, the dictionary priority degree decision unit 211 sets the priority degree of the local dictionary corresponding to the main subject at "high".

In step S405, the dictionary priority degree decision unit 211 determines whether the tracking mode has been set at "tracking priority". In a case where the tracking mode has been set at "tracking priority", the processing step proceeds to step S406; in a case where the tracking mode has been set at "normal", the processing step proceeds to step S407.

A description is now given of the tracking mode. The control unit 201 sets the tracking mode at "normal" (a first mode) or "tracking priority" (a second mode) in accordance with whether a tracking button, which is included in the operation unit 106, is depressed by the user. The tracking button is a button that is intended for the user to input, to the camera 100, a user input indicating an intention to track the main subject (a tracking instruction). The control unit 201 sets the tracking mode at "normal" before the tracking instruction is received (e.g., at the time of activation of the camera 100). Once the user has depressed the tracking button, the control unit 201 receives the tracking instruction. In response to the reception of the tracking instruction, the control unit 201 sets the tracking mode at "tracking priority". Once the user has released the tracking button, the reception of the tracking instruction stops, and the control unit 201 sets the tracking mode at "normal".

Note that a configuration for inputting the tracking instruction to the camera 100 need not necessarily be a button. For example, it is permissible to adopt a configuration in which the tracking instruction is input as a result of the user touching a touch panel display of the display unit 105. Alternatively, it is permissible to adopt a configuration in which the tracking instruction is input in accordance with the state of the eyeball of the user who is looking through a viewfinder (not shown) (e.g., a configuration in which the tracking instruction is input in a case where the line-of-sight of the user is directed at the main subject).

In step S406, the dictionary priority degree decision unit 211 sets the priority degrees of all other dictionaries (base dictionaries and local dictionaries for which the priority degrees have not yet been set) at "low". Note that "the priority degrees have not yet been set" mentioned here means that the priority degrees have not yet been set in processing of step S308 related to the current frame. Even if dictionaries have priority degrees that were set in connection with former frames, they are equivalent to dictionaries for which the priority degrees have not yet been set as long as they do not have priority degrees that have been set in connection with the current frame. The same goes for step S407, which will be described later.

In step S407, the dictionary priority degree decision unit 211 determines whether there are dictionaries for which the priority degrees have not yet been set. In a case where there are dictionaries for which the priority degrees have not yet been set, the processing step proceeds to step S408. In a case where there are no dictionaries for which the priority degrees have not yet been set, processing of the present flowchart ends.

In step S408, the dictionary priority degree decision unit 211 sets the priority degrees of local dictionaries at "low", and sets the priority degrees of base dictionaries at "medium", among the dictionaries for which the priority degrees have not yet been set.

Next, the details of processing for deciding on the control schedule for dictionaries in step S309 of FIG. 3 will be described with reference to FIG. 5.

In step S500, the dictionary changeover control unit 212 determines whether the settings on the priority degrees of dictionaries have been changed through processing of step S308. In a case where the settings on the priority degrees of dictionaries have been changed, the processing step proceeds to step S501; in a case where the settings on the priority degrees of dictionaries have not been changed, processing of the present flowchart ends. Therefore, similarly to processing for deciding on the priority degrees of dictionaries (step S308), processing for deciding on the control schedule for dictionaries is executed in two cases, namely, in a case where the main subject or the tracking mode has been changed and a case where the current frame is the first frame. In other cases, the control schedule for dictionaries that was decided on before is maintained.

In step S502, the dictionary changeover control unit 212 sets the detection cycle for dictionaries with a priority degree of "high" at 1 [frame/detection]. The detection cycle is a parameter [frame/detection] indicating a frame interval at which the result of one detection is obtained. Note that the detection cycle is not limited to the number of frames per detection [frame/detection], and may be defined as, for example, a time period per detection [ms/detection].

In step S503, the dictionary changeover control unit 212 sets the detection cycles for other dictionaries, that is to say, dictionaries with a priority degree of "medium" or "low". Specific examples of setting of the detection cycles in step S503 will be described later with reference to FIG. 6A to FIG. 9.

In step S504, the dictionary changeover control unit 212 decides on the control schedule for dictionaries based on the detection cycle of each dictionary and on the number of times the detector 213 can execute detection processing within one frame period. Specific examples of the decision on the control schedule for dictionaries will be described later with reference to FIG. 6A to FIG. 9.

Figure 4:
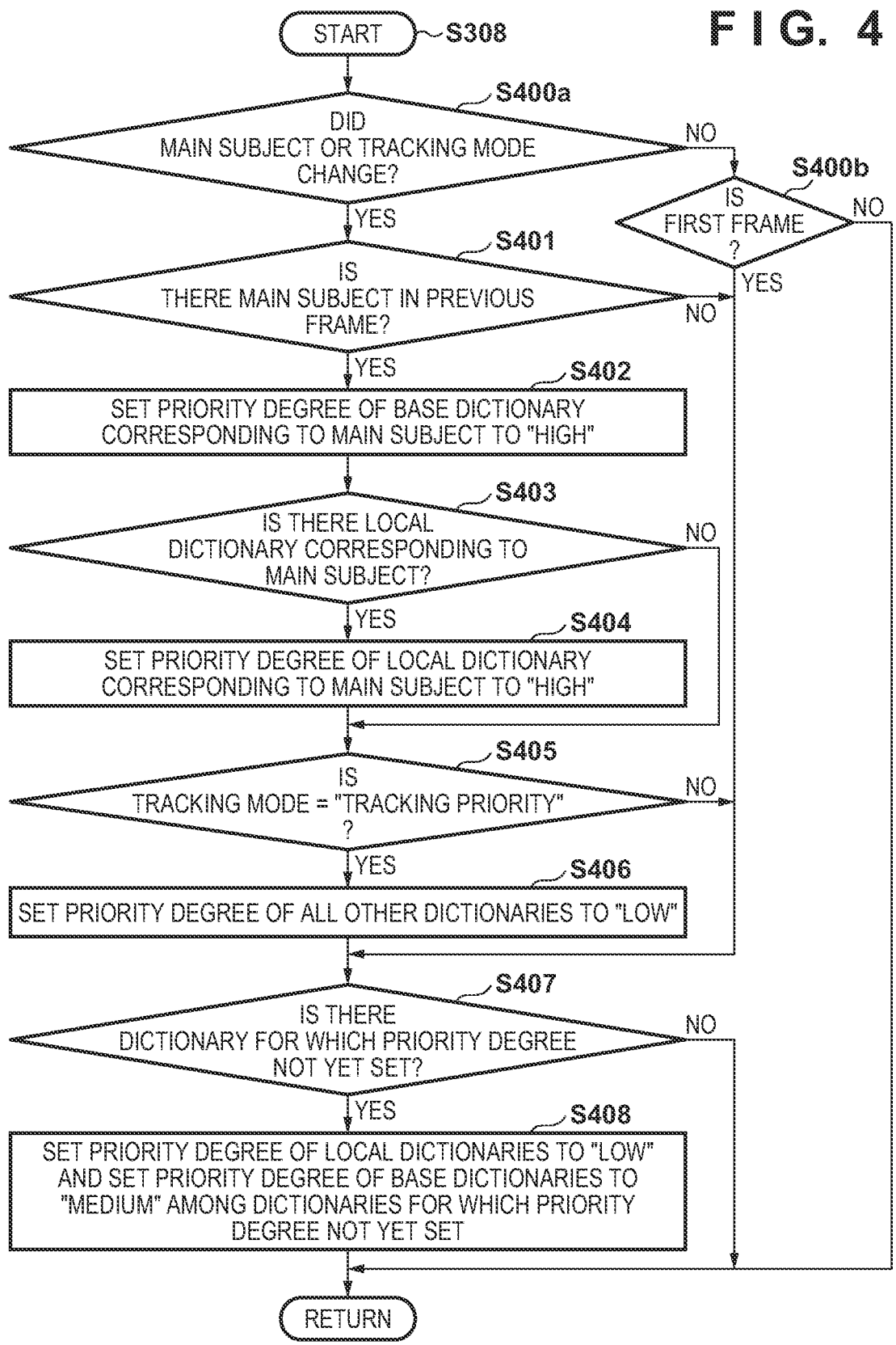
FIG. 4 is a flowchart showing the details of processing for deciding on the priority degrees of dictionaries in step S308 of FIG. 3.
Figure 5:
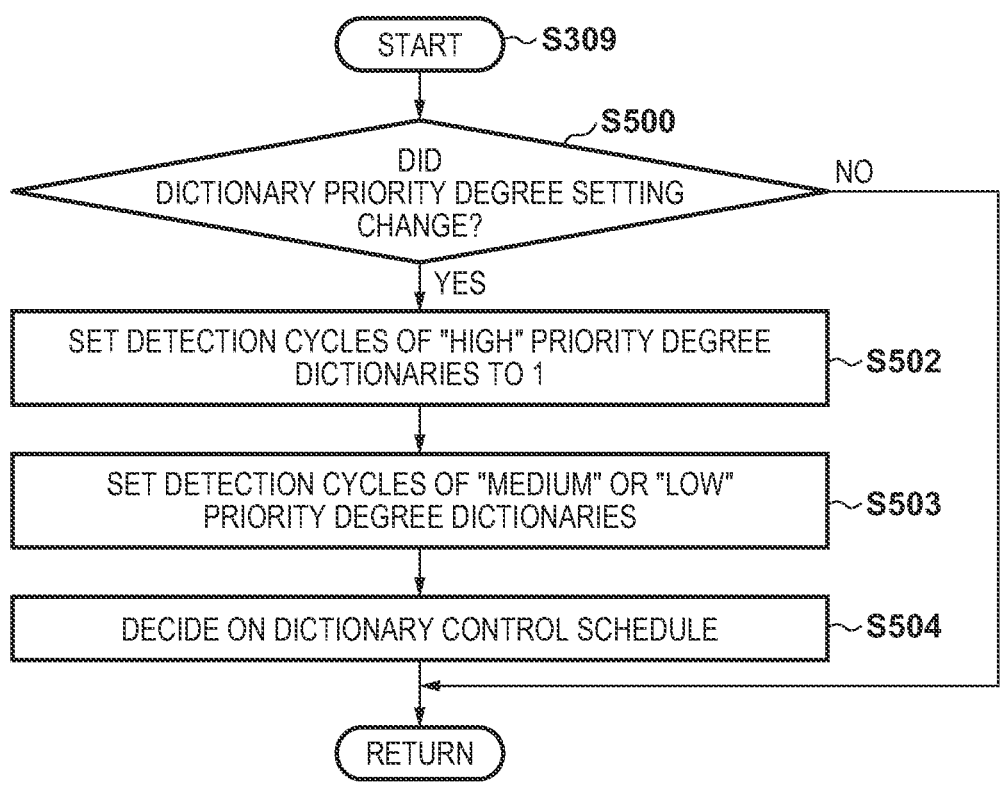
FIG. 5 is a flowchart showing the details of processing for deciding on a control schedule for dictionaries in step S309 of FIG. 3 according to a first embodiment.

Note that according to the examples shown in FIG. 4 and FIG. 5, the priority degree and the detection cycle of each dictionary are set in accordance with whether there is a main subject, the type of the main subject, and the tracking mode, and the control schedule for dictionaries is decided on based on the detection cycle of each dictionary. However, the method of deciding on the control schedule for dictionaries is not limited to the examples shown in FIG. 4 and FIG. 5. For example, a table for associating whether there is a main subject, the type of the main subject, a tracking mode, and a control schedule for dictionaries with one another may be stored in advance in the ROM inside the computation apparatus 102. In this case, the dictionary changeover control unit 212 can obtain a corresponding control schedule from the table based on whether there is a main subject, the type of the main subject, and a tracking mode.

Next, a description is given of examples of the detection cycles and the control schedule of dictionaries for a case where there is no local dictionary with reference to FIGS. 6A to 6C and FIG. 7.

FIG. 6A is a diagram showing the types of dictionaries and restrictions on processing of the detector. The camera 100 uses five types of dictionaries that respectively correspond to persons, dogs, birds, four-wheel vehicles, and two-wheel vehicles. Also, the detector 213 provided in the camera 100 includes one logic circuit block, and the number of times detection processing can be executed per frame is three. It is assumed that a four-wheel vehicle refers to a racing vehicle, such as a four-wheel rally car, or a four-wheel passenger car, whereas a two-wheel vehicle refers to a two-wheel motorbike or a bicycle. In processing of FIG. 4 and FIG. 5, the priority degree, the detection cycle, and the control schedule of each dictionary are decided on based on the conditions of FIG. 6A.

FIG. 6B shows the detection cycle of each dictionary for a case where the tracking mode is "normal", and FIG. 6C shows the detection cycle of each dictionary for a case where the tracking mode is "tracking priority". In FIG. 6B and FIG. 6C, "0" indicates that the corresponding dictionary is not used. As shown in FIG. 6B and FIG. 6C, in a case where no main subject has been detected, the detection cycle of every dictionary is set at 2 [frame/detection], regardless of the tracking mode. On the other hand, in a case where some sort of main subject has been detected and the tracking mode is "normal", the detection cycle of the dictionary corresponding to the type of the main subject is set at 1 [frame/detection], whereas the detection cycles of other dictionaries are set at 2 [frame/detection], as shown in FIG. 6B. Also, in a case where some sort of main subject has been detected and the tracking mode is "tracking priority", the detection cycle of the dictionary corresponding to the type of the main subject is set at 1 [frame/detection], whereas the detection cycles of other dictionaries are set at 0 [frame/detection], as shown in FIG. 6C. That is to say, in this case, the dictionaries other than the dictionary corresponding to the type of the main subject are not used.

Figure 7:
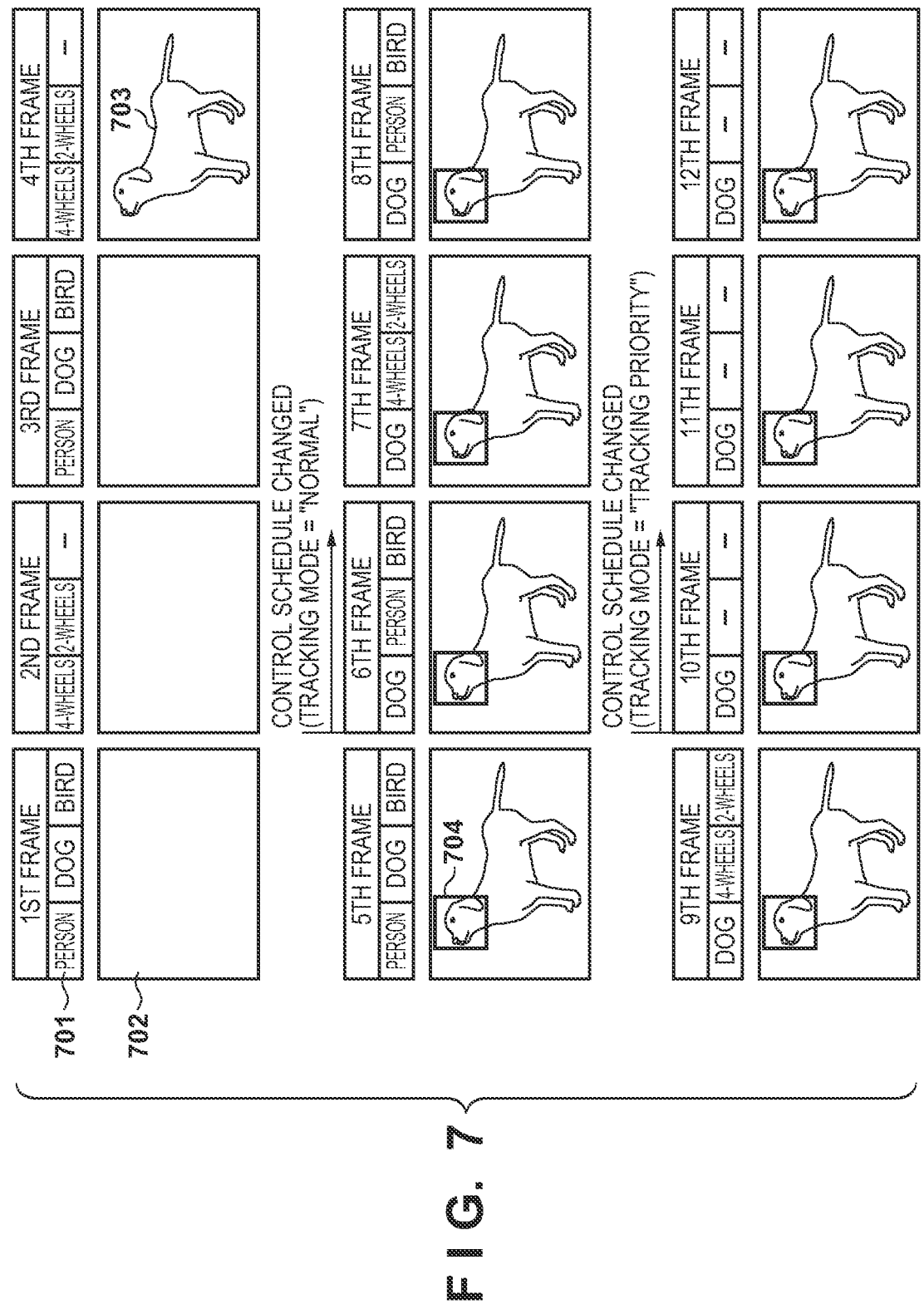
FIG. 7 is a diagram illustrating examples of detection cycles and a control schedule for dictionaries for a case where there is no local dictionary according to the first embodiment.

FIG. 7 is a diagram showing examples of a control schedule for dictionaries and a change therein. The examples of FIG. 7 are based on the assumption that a dog 703 is detected in the midst of sequential frames. In FIG. 7, reference sign 701 indicates dictionaries that are scheduled with respect to each frame (i.e., dictionaries that are input to the detector 213 and used in each frame). Reference sign 702 indicates shot images that are input to the detector 213.

In FIG. 7, at the timing of the first frame, no main subject has been detected. Therefore, the detection cycle of every dictionary is set at 2 [frame/detection]. As a result, a control schedule is decided on with two frames serving as a unit, so that the dictionaries corresponding to "persons", "dogs", and "birds" are used in the first frame, and the dictionaries corresponding to "four-wheel vehicles" and "two-wheel vehicles" are used in the next frame.

In the first to the fourth frame, no main subject is detected. In the fourth frame, although the dog 703 appears in a shot image, the dog 703 is not detected as a subject because the dictionary corresponding to dogs is not used. Therefore, in the first frame to the fifth frame, which includes the frame next to the fourth frame, the dictionaries used in each frame are selected in accordance with the control schedule that was decided on at the beginning.

In the fifth frame, the detector 213 performs subject detection using the dictionary corresponding to dogs; as a result, the face of the dog 704 is detected as a subject. As only the dog 704 is the detected subject, the dog 704 is determined to be a main subject. It is assumed that, at this point, the tracking mode is "normal". Therefore, in the frame next to the fifth frame (the sixth frame), the detection cycle of the dictionary corresponding to "dogs" is set at 1 [frame/detection], and the detection cycles of other dictionaries (corresponding to persons, birds, four-wheel vehicles, and two-wheel vehicles) are set at 2 [frame/detection]. As a result, the control schedule is decided on with two frames serving as a unit, so that the dictionaries corresponding to "dogs", "persons", and "birds" are used in the first frame, and the dictionaries corresponding to "dogs", "four-wheel vehicles", and "two-wheel vehicles" are used in the next frame.

The main subject and the tracking mode do not change between the sixth and the ninth frames. Therefore, in the sixth to the ninth frames, the dictionaries used in each frame are selected in accordance with the control schedule that was decided on in the sixth frame. As a result of detection of the dog 704 as the main subject, the frequency of use (the frequency of selection) of the dictionary corresponding to dogs increases compared to pre-detection, thereby making it possible to detect the main subject with high accuracy (i.e., to track the main subject with high accuracy). Furthermore, as the dictionaries other than the dictionary corresponding to dogs still remain to be used, subjects other than a dog can also be detected in a case where subjects other than a dog appear in a shot image; depending on the situation, the main subject may change to a subject of a type other than a dog.

It is assumed that the tracking mode is changed to "tracking priority" in the tenth frame. In this case, the detection cycle of the dictionary corresponding to "dogs" is set at 1 [frame/detection], and the detection cycles of other dictionaries (corresponding to persons, birds, four-wheel vehicles, and two-wheel vehicles) are set at 0 [frame/detection]. That is to say, the detection cycles are set so that the dictionaries other than the dictionary corresponding to dogs are not used. As a result, the control schedule is decided on so that only the dictionary corresponding to "dogs" is used on a per-frame basis (i.e., every frame).

As described above, in a case where the tracking mode is "tracking priority", the frequency of use (the frequency of selection) of the dictionaries other than the dictionary corresponding to the type of the main subject decreases compared to a case where the tracking mode is "normal". This leads to a decrease in the possibility of erroneous detection of a subject of another type, and the possibility that the main subject changes to a subject that has been erroneously detected.

Note that in the examples of FIGS. 6A to 6C and FIG. 7, the frequency of use (the frequency of selection) of the dictionaries other than the dictionary corresponding to the type of the main subject has decreased to 0. That is to say, the dictionaries other than the dictionary corresponding to the type of the main subject are excluded from the candidates for selection of dictionaries by the dictionary changeover control unit 212. However, control on the frequency of use (the frequency of selection) of dictionaries in the present embodiment is not limited to the examples shown in FIGS. 6A to 6C and FIG. 7. For example, it is permissible to adopt a configuration in which, in a case where a detected main subject is a dog and the tracking mode is "tracking priority", the detection cycles of the dictionaries other than the dictionary corresponding to dogs is set at 4 [frame/detection].

In this case also, the frequency of use (the frequency of selection) of the dictionaries other than the dictionary corresponding to the type of the main subject has decreased, thereby achieving the advantageous effect of the decrease in the possibility of erroneous detection of a subject of another type, and the possibility that the main subject changes to a subject that has been erroneously detected.

Furthermore, in the examples of FIG. 7, in a case where a main subject has been detected and the tracking mode is "tracking priority", the number of the dictionaries that are used (the number of the dictionaries that are included among the candidates for selection by the dictionary changeover control unit 212) is smaller than the number of times the detector 213 can execute detection processing within one frame period. In this case, the control unit 201 may improve the tracking performance by performing control to increase the frame rate of input images (the frame rate of image capturing). Alternatively, it is permissible to adopt a configuration in which the tracking performance is improved by additionally using a dictionary intended for a purpose other than subject detection, such as for region estimation, without changing the frame rate of input images.

Next, a description is given of examples of the detection cycles and the control schedule of dictionaries for a case where there are local dictionaries with reference to FIGS. 8A to 8C and FIG. 9.

FIG. 8A is a diagram showing the types of dictionaries and restrictions on processing of the detector. Unlike the examples of FIG. 6A, there are local dictionaries with respect to persons, dogs, and birds. That is to say, in the examples of FIG. 8A, a local dictionary corresponding to persons is associated with a base dictionary corresponding to persons, and similar association exists with respect to dogs and birds as well. In processing of FIG. 4 and FIG. 5, the priority degree, the detection cycle, and the control schedule of each dictionary are decided on based on the conditions of FIG. 8A.

FIG. 8B shows the detection cycle of each dictionary for a case where the tracking mode is "normal", and FIG. 8C shows the detection cycle of each dictionary for a case where the tracking mode is "tracking priority". In FIG. 8B and FIG. 8C, "0" indicates that the corresponding dictionary is not used. As shown in FIG. 8B and FIG. 8C, in a case where no main subject has been detected, the detection cycle of every base dictionary is set at 2 [frame/detection], and the detection cycle of every local dictionary is set at 0 [frame/detection], regardless of the tracking mode.

On the other hand, in a case where a main subject with a local dictionary has been detected and the tracking mode is "normal", the detection cycles of the base dictionary and the local dictionary corresponding to the type of the main subject are set at 1 [frame/detection], the detection cycles of other base dictionaries are set at 4 [frame/detection], and the detection cycles of other local dictionaries are set at 0 [frame/detection], as shown in FIG. 8B. Also, in a case where a main subject with no local dictionary has been detected and the tracking mode is "normal", the detection cycles of base dictionaries are set similarly to the case of FIG. 6B, and the detection cycle of every local dictionary is set at 0 [frame/detection].

In a case where a main subject with a local dictionary has been detected and the tracking mode is "tracking priority", the detection cycles of the base dictionary and the local dictionary corresponding to the type of the main subject are set at 1 [frame/detection], and the detection cycles of other base dictionaries and local dictionaries are set at 0 [frame/detection], as shown in FIG. 8C. That is to say, in this case, the dictionaries other than the dictionary corresponding to the type of the main subject are not used.

Figure 9:
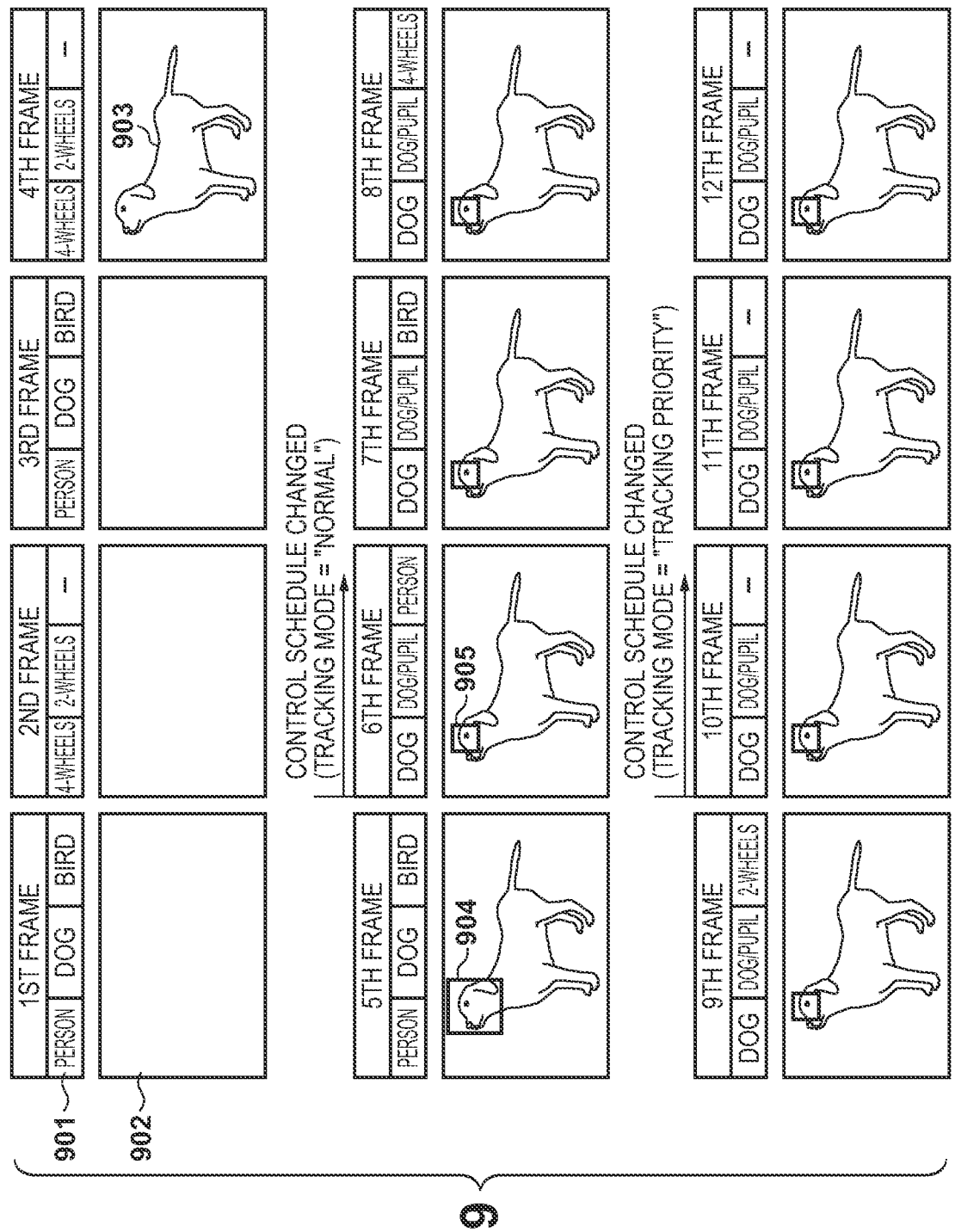
FIG. 9 is a diagram illustrating examples of detection cycles and a control schedule for dictionaries for a case where there are local dictionaries according to the first embodiment.

FIG. 9 is a diagram showing examples of a control schedule for dictionaries and a change therein. In FIG. 9, reference sign 901 indicates dictionaries that are scheduled with respect to each frame (i.e., dictionaries that are input to the detector 213 and used in each frame). Reference sign 902 indicates shot images that are input to the detector 213.

Similarly to the examples of FIG. 7, a dog 904 is detected in the fifth frame, and the control schedule for dictionaries is changed in the sixth frame. However, unlike FIG. 7, in the examples of FIG. 9, as the detection cycle of the local dictionary corresponding to dogs is also set at 1 [frame/detection], the local dictionary corresponding to dogs is also used and the dog's pupil indicated by reference sign 905 is also detected, in addition to the dog's face, on a per-frame basis in the sixth and subsequent frames.

It is assumed that the tracking mode is changed to "tracking priority" in the tenth frame. In this case, the priority degrees of all dictionaries other than the base dictionary and the local dictionary corresponding to dogs are set at "low". Therefore, in the subsequent frames, only the base dictionary and the local dictionary corresponding to dogs are input to the detector 213 and used.

As described above, similarly to the examples of FIGS. 6A to 6C and FIG. 7 in which there are no local dictionaries, when there are local dictionaries, too, the frequency of use (the frequency of selection) of base dictionaries other than the dictionary corresponding to the type of the main subject decreases in a case where the tracking mode is "tracking priority" compared to a case where the tracking mode is "normal". This leads to a decrease in the possibility of erroneous detection of a subject of another type, and the possibility that the main subject changes to a subject that has been erroneously detected.

As described above, according to the first embodiment, the camera 100 executes subject detection processing with respect to each of a plurality of images obtained through image capturing, using one or more dictionaries that are a part of a plurality of dictionaries. The plurality of dictionaries are respectively intended to detect different types of subjects. Furthermore, the camera 100 sets a tracking mode. The camera 100 selects one or more dictionaries to be used in the subject detection processing. Regarding this selection, the camera 100 selects a dictionary (second dictionary) different from a dictionary (first dictionary) corresponding to the type of the subject that was detected in an image before, at a frequency corresponding to the tracking mode.

In this way, according to the present embodiment, the frequency of use of a dictionary different from a dictionary corresponding to the type of the detected subject can be changed via the setting of the tracking mode. Therefore, a balance between the tracking performance for the detected subject and the detection performance for another subject can be adjusted.

Second Embodiment

The first embodiment has been described using an exemplary case where the number of dictionaries for which the priority degrees are set at "high" is smaller than the number of times the detector 213 can execute subject detection processing within one frame period. That is to say, in the first embodiment, the subject detection processing can be executed using all dictionaries for which the priority degrees are set at "high", and the subject detection processing can be executed using at least one dictionary for which the priority degree is set at "medium", in any frame.

A second embodiment will be described in relation to a configuration for dictionary changeover control in a situation with tighter restrictions. In the second embodiment, the fundamental configuration and operations of the camera 100 are similar to those according to the first embodiment. The following mainly describes the differences from the first embodiment.

In the second embodiment, processing of FIG. 10, instead of FIG. 5, is executed in step S309 of FIG. 3. FIG. 10 is a flowchart showing the details of processing for deciding on a control schedule for dictionaries in step S309 of FIG. 3 according to the second embodiment.

In step S1000, the dictionary changeover control unit 212 determines whether the settings on the priority degrees of dictionaries have been changed through processing of step S308. In a case where the settings on the priority degrees of dictionaries have been changed, the processing step proceeds to step S1002; in a case where the settings on the priority degrees of dictionaries have not been changed, processing of the present flowchart ends. Therefore, similarly to processing for deciding on the priority degrees of dictionaries (step S308), processing for deciding on the control schedule for dictionaries is executed in two cases, namely, in a case where the main subject or the tracking mode has been changed and a case where the current frame is the first frame. In other cases, the control schedule for dictionaries that was decided on before is maintained.

In step S1002, the dictionary changeover control unit 212 determines whether there is a dictionary with a priority degree of "medium". In a case where there is a dictionary with a priority degree of "medium", the processing step proceeds to step S1003; in a case where there is no dictionary with a priority degree of "medium", the processing step proceeds to step S1004.

In step S1003, the dictionary changeover control unit 212 sets the detection cycles of dictionaries with a priority degree of "high" in accordance with the following formula, using the number of dictionaries with a priority degree of "high" and the number of times the detector 213 can perform the detection per frame.

Detection cycle=((the number of dictionaries with a priority degree of "high")÷(the number of times the detection can be performed per frame))+1 Note, it is assumed that the fractional part that has arisen from the division is cut off in the above formula. For example, in a case where the number of dictionaries with a priority degree of "high" is 2 and the number of times the detection can be performed per frame is also 2, the detection cycle is set at 2÷2+1=2. Furthermore, also in a case where the number of dictionaries with a priority degree of "high" is 3 and the number of times the detection can be performed per frame is 2, the detection cycle is similarly set at 3÷2+1=2 (the fractional part is cut off).

In step S1004, the dictionary changeover control unit 212 sets the detection cycles of dictionaries with a priority degree of "high" in accordance with the following formula, using the number of dictionaries with a priority degree of "high" and the number of times the detector 213 can perform the detection per frame.

Detection cycle=(the number of dictionaries with a priority degree of "high")±(the number of times the detection can be performed per frame) Note, it is assumed that a fractional part resulting from the division is rounded up in the above formula, unlike the case of step S1003.

FIGS. 11A and 11B are diagrams in which the calculation results of steps S1003 and S1004 in FIG. 10 are shown in order. FIG. 11A shows the number of times the detector can execute the detection processing per frame (the number of times the detector can perform the detection per frame). FIG. 11B shows the detection cycles of dictionaries with a priority degree of "high", which are determined based on the combination of the number of dictionaries with a priority degree of "high" and the number of dictionaries with a priority degree of "medium".

In step S1005, the dictionary changeover control unit 212 sets the detection cycles of the remaining dictionaries, that is to say, the dictionaries with a priority degree of "medium" or "low". Specific examples of setting of the detection cycles in step S1005 will be described later with reference to FIG. 12A to FIG. 14.

In step S1006, the dictionary changeover control unit 212 decides on a control schedule for dictionaries based on the detection cycle of each dictionary and on the number of times the detector 213 can execute the detection processing within one frame period. Specific examples of the decision on the control schedule for dictionaries will be described later with reference to FIG. 12A to Next, a description is given of two specific examples related to the detection cycles and the control schedule of dictionaries according to the second embodiment with reference to FIG. 12A to FIG. 14.

FIG. 12A is a diagram showing the types of dictionaries and restrictions on processing of the detector. FIG. 12B is a diagram showing the detection cycle of each dictionary illustrated in FIG. 10 for a case where the tracking mode is "normal". FIG. 12C is a diagram showing the detection cycle of each dictionary illustrated in FIG. 10 for a case where the tracking mode is "tracking priority".

Figure 13:
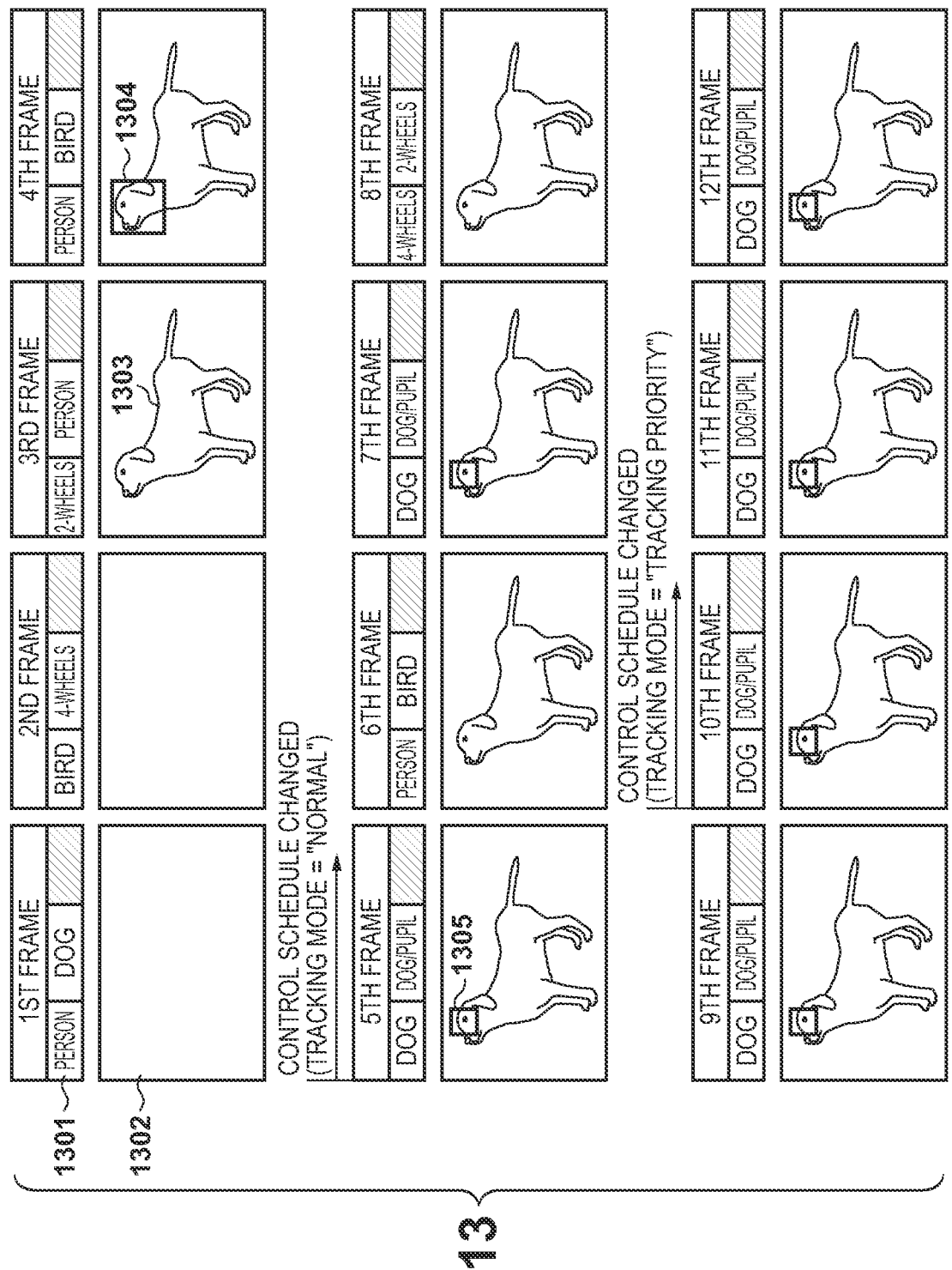
FIG. 13 is a diagram illustrating two specific examples related to detection cycles and a control schedule for dictionaries according to the second embodiment.

A description is now given of the control schedule for dictionaries in a scenario where a dog is detected as a main subject with reference to FIG. 13. In FIG. 13, reference sign 1301 indicates dictionaries that are scheduled with respect to each frame (i.e., dictionaries that are input to the detector 213 and used in each frame). Reference sign 1302 indicates shot images that are input to the detector 213.

A dog 1303 appears in the third frame, and a dog 1304 is detected in the fourth frame. As a result, the control schedule for dictionaries is changed from the fifth frame. From the fifth frame, the priority degrees of two dictionaries, namely the base dictionary (face) and the local dictionary (pupil) corresponding to dogs are set at "high", and the priority degrees of dictionaries other than the dictionaries corresponding to dogs are set at "medium". Considering that the number of times the detection can be performed per frame is 2, the detection cycles of the base dictionary and the local dictionary corresponding to dogs are decided to be 2÷2+1=2 [frame/detection], in accordance with step S1003 in FIG. 10. Consequently, as shown in the fifth to the ninth frame in FIG. 13, the dictionaries related to subjects other than a dog can also be used by the detector 213 every other frame.

In the present example, the detector 213 has a processing capability of executing subject detection processing using two dictionaries within one frame period. Then, in a situation where a main subject has been detected and the tracking mode is "normal", the number of dictionaries with a priority degree of "high" is equal to the number of dictionaries that the detector 213 can use within one frame period. In this situation, the dictionary changeover control unit 212 repeatedly alternates between the selection of all dictionaries with a priority degree of "high" and the selection of dictionaries other than the dictionaries with a priority degree of "high" on a per-frame basis (on a per-image basis).

Note that the dictionaries with a priority degree of "high" need not necessarily be used in the same frame; for example, it is permissible to adopt a control schedule with which the base dictionaries corresponding to dogs and persons are used in the fifth frame, and the local dictionary corresponding to dogs and the base dictionary corresponding to birds are used in the sixth frame.

It is assumed that the tracking mode is set at "tracking priority" in the tenth frame. At this time, the priority degrees of dictionaries other than the base dictionary and the local dictionary corresponding to dogs are set at "low". As a result, the detection cycles of the base dictionary and the local dictionary corresponding to dogs are decided to be 2÷2=1 [frame/detection], in accordance with step S1004 in FIG. 10. Therefore, in the subsequent frames, only the base dictionary and the local dictionary corresponding to dogs are input to the detector 213.

Figure 14:
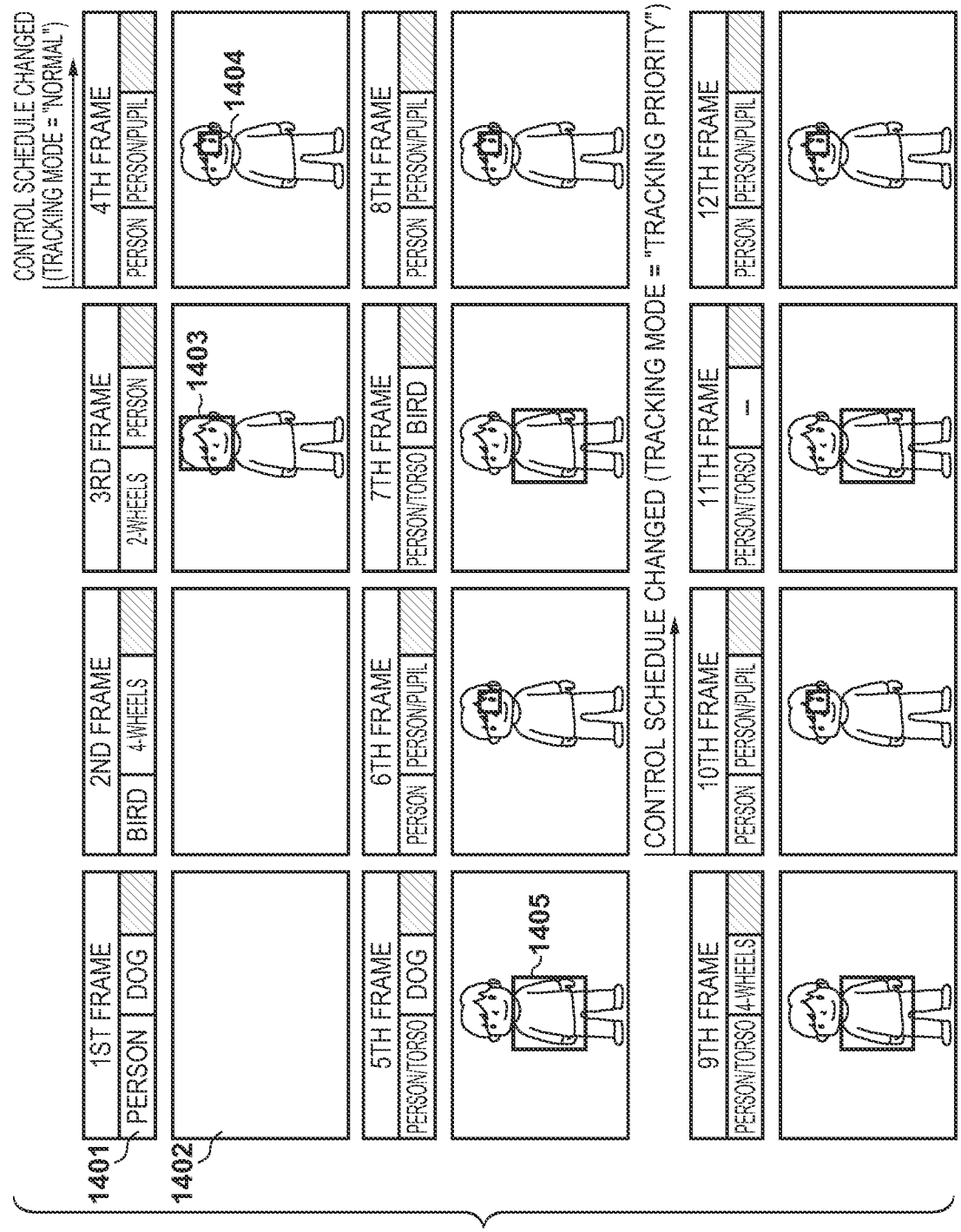
FIG. 14 is a diagram illustrating two specific examples related to detection cycles and a control schedule for dictionaries according to the second embodiment.

Next, a description is given of the control schedule for dictionaries in a scenario where a person is detected as a main subject with reference to FIG. 14. In FIG. 14, reference sign 1401 indicates dictionaries that are scheduled with respect to each frame (i.e., dictionaries that are input to the detector 213 and used in each frame). Reference sign 1402 indicates shot images that are input to the detector 213.

A person 1403 appears, and is detected, in the third frame. As a result, the control schedule for dictionaries is changed from the fourth frame. From the fourth frame, the priority degrees of three dictionaries, namely the base dictionary (face) and the local dictionaries (pupil and torso) corresponding to persons are set at "high", and the priority degrees of dictionaries other than the dictionaries corresponding to persons are set at "medium". Therefore, the detection cycles of the base dictionary and the local dictionaries corresponding to persons are decided to be 3÷2+1=2 [frame/detection] (the fractional part is cut off), in accordance with step S1003 in FIG. 10. Consequently, the dictionaries with a priority degree of "medium" can also be used by the detector 213 as shown in the fifth to the ninth frames in FIG. 14.

In the present example, the detector 213 has a processing capability of executing subject detection processing using two dictionaries within one frame period. Then, in a situation where a main subject has been detected and the tracking mode is "normal", the number of dictionaries with a priority degree of "high" is different from N-fold of the number of dictionaries that the detector 213 can use within one frame period (where N is a natural number). In this situation, the dictionary changeover control unit 212 selects the dictionaries to be used by the detector 213 so that at least one of the dictionaries with a priority degree of "high" is included every frame (every image).

It is assumed that the tracking mode is set at "tracking priority" in the tenth frame. At this time, the priority degrees of dictionaries other than the base dictionary and the local dictionaries corresponding to persons are set at "low". As a result, the detection cycles of the base dictionary and the local dictionaries corresponding to persons are decided to be 3÷2=2 [frame/detection] (a fractional part is rounded up), in accordance with step S1004 in FIG. 10. Therefore, in the subsequent frames, only the base dictionary and the local dictionaries corresponding to persons are input to the detector 213.

Note that in FIG. 14, control for deciding on a main subject on a per-frame basis is performed for the sake of explanation; however, a main subject used in the tracking computation unit 203 need not necessarily be changed on a per-frame basis. For example, it is permissible to adopt, among others, a configuration in which once a pupil has been detected, the detection results other than the pupil are not used and a main subject region is decided on through the tracking processing executed by the tracking computation unit 203, until a predetermines number of frames elapse.

As described above, according to the second embodiment, the detector 213 has a processing capability of executing subject detection processing using a predetermined number of (2 in the examples of FIG. 11A to FIG. 14) dictionaries within one frame period. In this situation, even if the number of two or more dictionaries with a priority degree of "high" is equal to or larger than the number (predetermined number) of the dictionaries that the detector 213 can use within one frame period, subject detection processing that uses the dictionaries with a priority degree of "medium" can be executed.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-013583, filed Jan. 31, 2022 which is hereby incorporated by reference herein in its entirety.

What is claimed is:

1. An image processing apparatus comprising at least one processor which functions as:
a detection unit configured to execute subject detection processing with respect to each of a plurality of images obtained through image capturing performed by an image capturing circuit, using one or more dictionaries that are a part of a plurality of dictionaries, the plurality of dictionaries being respectively intended to detect subjects of different types;
a setting unit configured to set a tracking mode;
a selection unit configured to select the one or more dictionaries used by the detection unit, wherein the selection unit selects a second dictionary at a frequency corresponding to the tracking mode, the second dictionary being different from a first dictionary that corresponds to a type of a first subject detected in a previous image;
a reception unit configured to receive a user input indicating an intention to track the first subject; and
a control unit configured to control a frame rate of the image capturing,
wherein the setting unit sets the tracking mode at a first mode before the reception of the user input, and sets the tracking mode at a second mode in accordance with the reception of the user input, the first mode using the first dictionary and the second dictionary,
wherein when the tracking mode is set at the second mode, the selection unit reduces a frequency of selection of the second dictionary compared to a case where the tracking mode is set at the first mode by excluding the second dictionary from selection candidates, and
wherein when the tracking mode is set at the second mode, the control unit performs control so that the frame rate becomes high compared to a case where the tracking mode is set at the first mode.

2. The image processing apparatus according to claim 1, wherein
the detection unit has a processing capability of executing the subject detection processing using a predetermined number of dictionaries within one frame period of the image capturing that is performed at a predetermined frame rate, and
in a case where the selection unit has excluded the second dictionary from the selection candidates and a number of dictionaries included in the selection candidates has become smaller than the predetermined number, the detection unit executes, in addition to the subject detection processing that uses dictionaries included in the selection candidates, predetermined detection processing which is different from the subject detection processing and which uses a predetermined dictionary that is not included among the selection candidates.

3. The image processing apparatus according to claim 1, wherein
the plurality of dictionaries include a plurality of primary dictionaries and one or more secondary dictionaries that are each associated with one of the plurality of primary dictionaries,
the first dictionary corresponding to the type of the first subject is a first primary dictionary included among the plurality of primary dictionaries,
the second dictionary that is different from the first dictionary is a second primary dictionary which is included among the plurality of primary dictionaries and which is different from the first primary dictionary,
each of the plurality of primary dictionaries is configured to detect a specific region of a subject of a corresponding type,
each secondary dictionary of the one or more secondary dictionaries is configured to detect a region of a subject of a type corresponding to a primary dictionary, which is included among the plurality of primary dictionaries and associated with the each secondary dictionary, the region being different from the specific region, and before the first subject is detected, the selection unit selects the one or more dictionaries used by the detection unit so that the selected one or more dictionaries do not include a secondary dictionary, which is included among the one or more secondary dictionaries and associated with the first primary dictionary.

4. The image processing apparatus according to claim 1, wherein the selection unit increases a frequency of selection of the first dictionary in accordance with the detection of the first subject in the previous image.

5. The image processing apparatus according to claim 1, wherein the detection unit has a processing capability of executing the subject detection processing using a predetermined number of dictionaries within one frame period of the image capturing that is performed at a predetermined frame rate, the selection unit increases a frequency of selection of two or more dictionaries including the first dictionary in accordance with the detection of the first subject in the previous image, and in a case where a number of the two or more dictionaries is equal to the predetermined number, the selection unit repeatedly alternates between selection of the two or more dictionaries and selection of a dictionary other than the two or more dictionaries on a per-image basis.

6. The image processing apparatus according to claim 1, wherein the detection unit has a processing capability of executing the subject detection processing using a predetermined number of dictionaries within one frame period of the image capturing that is performed at a predetermined frame rate, the selection unit increases a frequency of selection of two or more dictionaries including the first dictionary in accordance with the detection of the first subject in the previous image, and in a case where a number of the two or more dictionaries is different from N-fold of the predetermined number (where N is any natural number), the selection unit selects the one or more dictionaries used by the detection unit so that the selected one or more dictionaries include at least one of the two or more dictionaries on a per-image basis.

7. The image processing apparatus according to claim 1, wherein the first subject is a main subject included among one or more subjects detected in the previous image.

8. The image processing apparatus according to claim 7, wherein the detection unit is configured to select the main subject from among the one or more subjects detected in the previous image.

9. The image processing apparatus according to claim 7, wherein the main subject is a subject with respect to which the image capturing circuit adjusts at least one of a focus or an exposure.

10. An image capturing apparatus, comprising:
the image processing apparatus according to claim 1; and
the image capturing circuit.

11. A control method executed by an image processing apparatus, comprising:

executing subject detection processing with respect to each of a plurality of images obtained through image capturing performed by an image capturing circuit, using one or more dictionaries that are a part of a plurality of dictionaries, the plurality of dictionaries being respectively intended to detect subjects of different types;

setting a tracking mode;

selecting the one or more dictionaries used in executing the subject detection processing, wherein the selecting selects a second dictionary at a frequency corresponding to the tracking mode, the second dictionary being different from a first dictionary that corresponds to a type of a first subject detected in a previous image;

receiving a user input indicating an intention to track the first subject; and controlling a frame rate of the image capturing, wherein the setting sets the tracking mode at a first mode before the reception of the user input, and sets the tracking mode at a second mode in accordance with the reception of the user input, the first mode using the first dictionary and the second dictionary, wherein when the tracking mode is set at the second mode, the selecting reduces a frequency of selection of the second dictionary compared to a case where the tracking mode is set at the first mode by excluding the second dictionary from selection candidates, and wherein when the tracking mode is set at the second mode, the controlling performs control so that the frame rate becomes high compared to a case where the tracking mode is set at the first mode.

12. A non-transitory computer-readable storage medium which stores a program for causing a computer to execute a control method comprising:

executing subject detection processing with respect to each of a plurality of images obtained through image capturing performed by an image capturing circuit, using one or more dictionaries that are a part of a plurality of dictionaries, the plurality of dictionaries being respectively intended to detect subjects of different types;

setting a tracking mode;

selecting the one or more dictionaries used in executing the subject detection processing, wherein the selecting selects a second dictionary at a frequency corresponding to the tracking mode, the second dictionary being different from a first dictionary that corresponds to a type of a first subject detected in a previous image;

receiving a user input indicating an intention to track the first subject; and controlling a frame rate of the image capturing, wherein the setting sets the tracking mode at a first mode before the reception of the user input, and sets the tracking mode at a second mode in accordance with the reception of the user input, the first mode using the first dictionary and the second dictionary, wherein when the tracking mode is set at the second mode, the selecting reduces a frequency of selection of the second dictionary compared to a case where the tracking mode is set at the first mode by excluding the second dictionary from selection candidates, and wherein when the tracking mode is set at the second mode, the controlling performs control so that the frame rate becomes high compared to a case where the tracking mode is set at the first mode.

* * * * *